United States Patent
Starita

(10) Patent No.: US 6,749,914 B2
(45) Date of Patent: Jun. 15, 2004

(54) MELT BLENDED HIGH-DENSITY POLYETHYLENE COMPOSITIONS WITH ENHANCED PROPERTIES AND METHOD FOR PRODUCING THE SAME

(76) Inventor: Joseph M. Starita, 1180 W. 5$^{th}$ St., Marysville, OH (US) 43040

( * ) Notice: Subject to any disclaimer, the term of this patent is extended or adjusted under 35 U.S.C. 154(b) by 0 days.

(21) Appl. No.: 10/017,314

(22) Filed: Dec. 14, 2001

(65) Prior Publication Data

US 2003/0114594 A1 Jun. 19, 2003

(51) Int. Cl.$^7$ .......................... B29D 23/00; C08L 23/08
(52) U.S. Cl. .......................... 428/36.9; 525/240; 525/55
(58) Field of Search ................... 525/240, 55; 428/35.7, 428/36.9; 524/197, 581; 522/161

(56) References Cited

U.S. PATENT DOCUMENTS 6,194,520 B1 * 2/2001 Cheruvu et al. ............ 525/240

* cited by examiner

Primary Examiner—James J. Seidleck
Assistant Examiner—Thao Tran
(74) Attorney, Agent, or Firm—Porter Wright Morris & Arthur LLP

(57) ABSTRACT

Melt blended HDPE for pipe and fitting material having a density in the range of 0.945 to 0.955 grams per cubic centimeter, values of melt flow index according to ASTM D1238 less than 0.4 with enhanced physical properties and process characteristics and blend methods are described in which virgin, reprocessed, wide specification, flake or regrind HMW homopolymer and copolymer HDPE (5 to <50%) are included as a minor component and HMW HDPE (>50 to 95%) is the major component. The method of selecting and blending the HMW HDPE copolymer, LMW HDPE homopolymer and LMW HDPE copolymer provides the corrugated HDPE pipe manufacturer with enhanced HDPE compositions and the means to independently design physical properties and enhance processability while exceeding AASHTO's standard for ESCR.

9 Claims, 5 Drawing Sheets

MELT BLENDED HIGH-DENSITY POLYETHYLENE COMPOSITIONS WITH ENHANCED PROPERTIES AND METHOD FOR PRODUCING THE SAME

FIELD OF INVENTION

The present invention addresses the compositional needs of corrugated high-density polyethylene (HDPE) pipe utilized for drainage, irrigation, storm and sanitary sewer applications. Poor environmental stress crack resistance (ESCR) of corrugated high-density polyethylene has been an impediment in competing against Polyvinylchloride (PVC), concrete and corrugated metal pipe. The corrugated plastic pipe fabricated from high-density polyethylene often cracks before, during or shortly after being installed in a trench and back filled due to insufficient ESCR. This problem has caused the American Association of State Highway Transportation Officials (AASHTO) to include a required minimum ESCR. This invention discloses HDPE compositions and methods for formulating HDPE compositions that are melt blends of virgin, preprocessed, regrind and recycled HDPE and comply with the standards of AASHTO for corrugated polyethylene pipe. These standards include specifications for density, melt flow index (MI), flexural modulus, tensile strength and environmental stress crack resistance of the pipe compounds and are incorporated herein by reference.

BACKGROUND AND SUMMARY OF INVENTION

The AASHTO standards for corrugated polyethylene pipe utilized for drainage, irrigation, storm and sanitary sewer applications typically require the pipe be fabricated from HDPE. Current AASHTO standards require the polyethylene compositions comply with cell classification of 335400C according to ASTM D-3350. The cell classification of 335400C requires a maximum Melt Flow Index (MI) at 190 degrees Centigrade as per ASTM D1238 of 0.4 grams per ten minutes, a density of 0.945 to 0.955 grams per cubic inch as per ASTM D1505, minimum flexural modulus of 110,000 pounds per square inch according to ASTM D790 and minimum tensile strength of 3,000 pounds per square inch according to ASTM D638 and a minimum environmental stress crack resistance of 24 hours determined by a notched constant tensile load (NCTL) of 15% of the yield stress of the polyethylene tested as per ASTM D5397. These polyethylene compositions have an additional AASHTO requirement requiring the addition of at least 2 percent by weight of carbon black particles for ultra-violet resistance.

Typically, corrugated polyethylene pipe manufacturers utilize specialty blow-molding grades of high-density polyethylene having a bimodal or multi-modal molecular weight distributions. Debras et al. in U.S. Pat. No. 6,218,472 disclosed such a polyethylene composition satisfies the current AASHTO standards by means of a multi stage polymerization. The disadvantage of this approach is that the pipe manufacturer typically pays a premium for as polymerized virgin corrugated pipe grade high-density polyethylene and can not easily modify the physical properties of the polyethylene composition to enhance the physical properties or processability in relation to the pipe size and profile shape. Ideally, the corrugated pipe manufacturers would prefer to purchase lower cost off specification, wide specification, reprocessed and recycled polyethylene components that they blend to meet the appropriate AASHTO standards. The prior art includes blending approaches. For example, Michie, Jr., U.S. Pat. No. 4,374,227, whereby medium density polyethylene pipe blends with improved low temperature brittleness properties and gloss are composed of HDPE, LLDPE and a carbon black concentrate. Michie, Jr. discloses a thermoplastic Medium Density Polyethylene (MDPE) composition having a nominal density of 0.926 to 0.940 grams per cubic centimeter. Unfortunately, this approach has the disadvantage of too low a density to meet the cell classification of 335400C according to ASTM D-3350 for corrugated and profile HDPE pipe. Similarly Boehm et al. in their U.S. Pat. No. 5,338,589 and Morimoto et al. in their U.S. Pat. No. 5,189,106 disclose MDPE having density ranges of 0.930 to 0.940 grams per cubic centimeter. Boehm et al. and Morimoto et al. both utilize specific and different two-stage polymerization processes to produce blending components for the resulting medium density polyethylenes. The disadvantage of this approach is that it is limited to medium density polyethylene and excludes the high-density polyethylene density range of 0.945 to 0.955 grams per cubic centimeter required for corrugated and profile polyethylene pipe. Su in U.S. Pat. No. 4,824,912 discloses terblends of a major portion of LLDPE and minor amounts of HDPE of low molecular weight and of HDPE having high molecular weight. This approach also has the same disadvantage of being limited to low and medium density polyethylene compositions.

The object of this invention is to disclose blends of commodity HDPE components that provide corrugated HDPE pipe compositions having a density range of 0.945 to 0.955 grams per cubic centimeter and a MI of less than 0.4 with enhanced stress crack resistance and processing characteristics. Generally, commercially available HDPE copolymers polymerized to produce blow-molding grades of HDPE are often utilized for corrugated pipe. Several commercially available HDPE copolymer blow molding grades similar to Chevron Phillips 5202 HDPE grade comply with AASHTO standards for density, MI, flexural modulus and tensile strength but fail the environmental stress crack resistance requirements for notched constant tensile load (NCTL) ASTM D5397. The low ESCR is due to their characteristic broad molecular weight distribution (MWD) that includes low molecular weight fractions.

A further object of this invention is to disclose blend compositions of virgin, off specification, wide specification, reprocessed and regrind polyethylenes that enhance stress crack resistance of polyethylene pipe blends by increasing the number of tie molecules and thereby decreasing the number of loose ends. The number of molecular loose ends is decreased by reducing number of shorter polyethylene molecules by melt blending HDPE with sufficiently high molecular weight to provide exceedingly high ESCR with low molecular weight HDPE components having narrow molecular weight distributions to provide improve processability. It is an additional object of this invention to disclose the specific physical properties required to select both the high molecular weight and the low molecular weight HDPE components so that the number of loose ends associated with the short molecules are minimized and the physical properties of the blend composition meets the desired performance standards.

It is a further object of this invention to disclose a lower cost and more flexible method of providing HDPE compositions for corrugated plastic pipe than as polymerized multimode polyethylenes. In this regard, the invention discloses a method of varying the composition of high density polyethylene components having sufficiently different values of density and melt index such that the density and melt index of the blended composition can be varied independently to attain enhanced physical properties and processability respectively while maintaining an enhanced environmental stress crack resistance.

It is an additional object of this invention to provide HDPE pipe material with:

Enhanced ESCR and long-term stress crack resistance by utilizing high molecular weight (HMW) HDPE component as the major component wherein the low molecular weight fraction is diminished with increased molecular weight.

Enhanced physical properties by utilizing low molecular weight HDPE homopolymer as a minor component having a characteristic narrow molecular weight distribution with higher density, flexural modulus and tensile strength.

Enhanced processability by utilizing low molecular weight HDPE copolymer as a minor component having a characteristic narrow molecular weight distribution devoid of short molecules and sufficiently high melt index to improve processability without dramatically greatly decreasing the ESCR.

It is the further objective of this invention is to provide the corrugated HDPE pipe and fittings manufacturers, the opportunity to vary the blend ratios of virgin, recycled, off specification, wide specification, reprocessed and regrind HMW and low molecular weight HDPE's to obtain the required combination of physical and process properties of pipe and fittings. For example the pipe manufacturer may vary blend ratios to enhance 24-hour impact behavior of the pipe, ESCR and flexural stiffness by specific pipe diameter and corrugation design.

This invention provides the benefit of blending recycled, reprocessed, wide and off specification and virgin HDPE's to provide corrugated HDPE pipe and fittings material compositions having enhanced physical properties and processing characteristics capable of meeting and exceeding AASHTO standards.

The invention is described more fully in the following description of the preferred embodiment considered in view of the drawings in which:

DESCRIPTIONS OF THE FIGURES

DETAILED DESCRIPTION OF THE INVENTION

A polyethylene composition according to this invention is a melt blend of HDPE resins for use in manufacturing but not limited to corrugated polyethylene pipe, fittings and accessories. Applications for the polyethylene pipe, fittings and accessories include but are not limited to drainage, storm sewer, sanitary sewer, irrigation and industrial sewer applications. In brief, a method is disclosed for producing melt blended HDPE for pipe and fitting material having a density in the range of 0.946 to 0.955 grams per cubic centimeter, values of melt flow index according to ASTM D01238 less than 0.4 with enhanced physical properties and process characteristics. The blend may include virgin, reprocessed, wide specification, flake or regrind LMW homopolymer and copolymer HDPE (5 to <50 %) as a minor component and HMW HDPE (>50 to 95%) as a major component. Methods of producing the compositions are presented. The method of selecting and blending the HMW HDPE copolymer, LMW HDPE homopolymer and LMW HDPE copolymer provides the corrugated HDPE pipe manufacturer with polyethylene compositions and the means to independently design physical properties and enhance processability while exceeding AASHTO's standard for ESCR.

Figure 1:
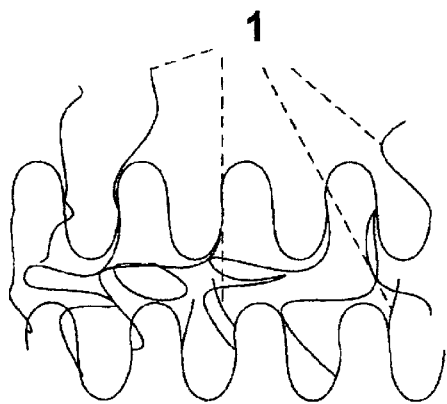
FIG. 1 shows a two dimensional representation of an unstressed HDPE lamellae.
Figure 2:
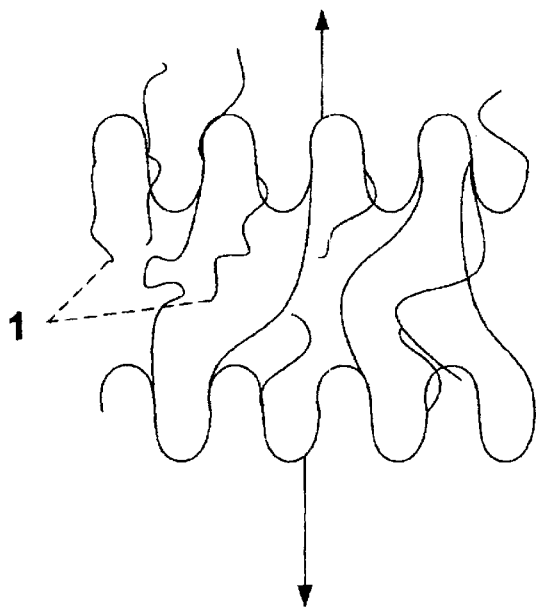
FIG. 2 shows a two dimensional representation of HDPE lamellae undergoing low tensile stress.
Figure 3:
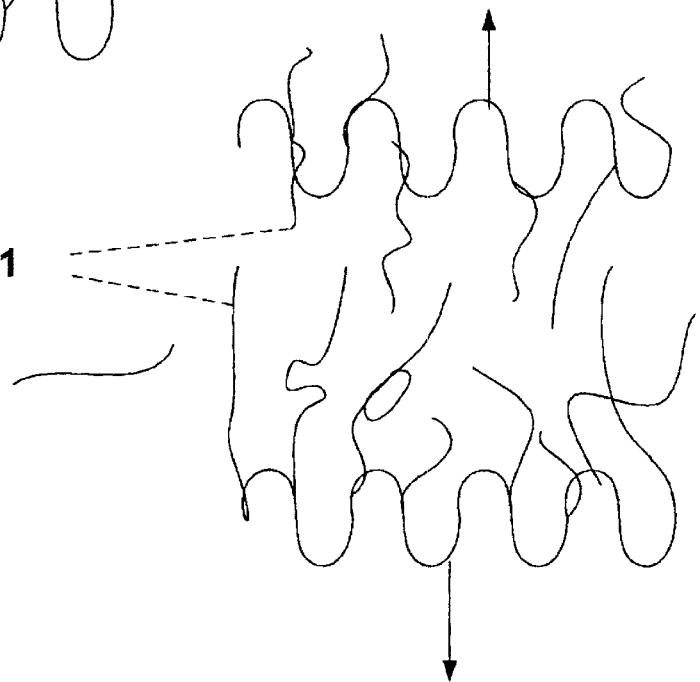
FIG. 3 shows a two dimensional representation of HDPE lamellae undergoing stress cracking due to application of low tensile stress over time.

The microstructure of HDPE is a series of lamellae (platelets) of folded molecules with molecular loose ends 1 dangling outside the lamellae and often entangled in the adjacent lamellae, as shown in FIG. 1. As presented by A. Lustiger ("Slow Crack Growth in Polyethylene", Proceedings of the Eighth Plastic Fuel Gas Symposium, American Gas Association, Columbus, Ohio, pp. 54–56) when a low stress is applied (FIG. 2) the linking chains have time to slowly disentangle themselves so that separation of the lamellae occurs, generating a smooth break or crack (FIG. 3).

Components of the polyethylene composition may include but are not limited to virgin pellets, virgin powder, virgin flake, recycled, reprocessed, regrind, off specification and wide specification grades of HDPE. This invention discloses the criteria for blending the HDPE components regardless of the grade utilized. In this way the manufacturer has the capability of selecting the most cost effective grade of HDPE.

It is known that corrugated polyethylene pipe composition may include additives such antioxidants, stabilizers and carbon black as typical examples in amounts of up to about 5% or more by weight.

The HDPE components in the form of virgin or reprocessed pellets, powder, flake or regrind are melt blended together, for example in an extruder or other mixer in a known manner. Virgin polyethylene components are commercially available from, e.g., Exxon Mobil (Irving, Tex.), Chevron Phillips Chemical Company LP (Houston, Tex.), Dow Chemical Company (Midland, Mich.), Formosa Plastics Company, (Houston, Tex.), and Huntsman Corporation (Houston, Tex.).

As referred to herein, density, MI and ESCR measurements are obtained accordance with standard criteria determined by AASHTO and ASTM.

The FRR is the ratio of the high load melt index (HLMI) to the melt index (MI). It is well Known that a low FRR value Indicates narrow molecular weight distribution and high FRR values indicate a wide molecular weight distribution.

The enhancement of the environmental and long-term stress crack resistance of polyethylene is based on an increase in the number of tie molecules connecting the crystalline lamellae of the semi crystalline high-density polyethylene pipe material. In this regard, the number of tie molecules is inversely related to low molecular weight fraction of polyethylene. In other words, low molecular weight polyethylene molecules associated with broad molecular weight distribution (MWD) high-density polyethylene diminish the number of tie molecules between lamellae and has the effect of decreasing the stress crack resistance.

Until the present invention, pipe manufacturers have had to rely on expensive specially polymerized HDPE to satisfy standards for physical properties of pipe. Conventional commodity unimodal HDPE has been unsatisfactory for use because of its broad molecular weight distribution, which includes a low molecular weight fraction (FIG. 4) that contributes to failure of the ESCR test as AASHTO requirements. More costly multi-modal HDPE (FIG. 5) has less of a low molecular weight fraction than the unimodal HDPE so that the ESCR requirement of 24 hours is marginally exceeded by about 5 to about 20 hours. If sections of the fabricated pipe are tested in lieu of the HDPE composition before manufacturing the pipe, the 5 to 20 hour margin of safety may be reduced or eliminated. The presence of carbon black and the adverse effects of the processing history cause the reduction in ESCR. To address this problem the polyethylene compositions disclosed in this invention provide an increased safety margin. The benefit is a significantly higher ESCR at a lower cost than commercially available as polymerized HDPE's.

Figure 4:
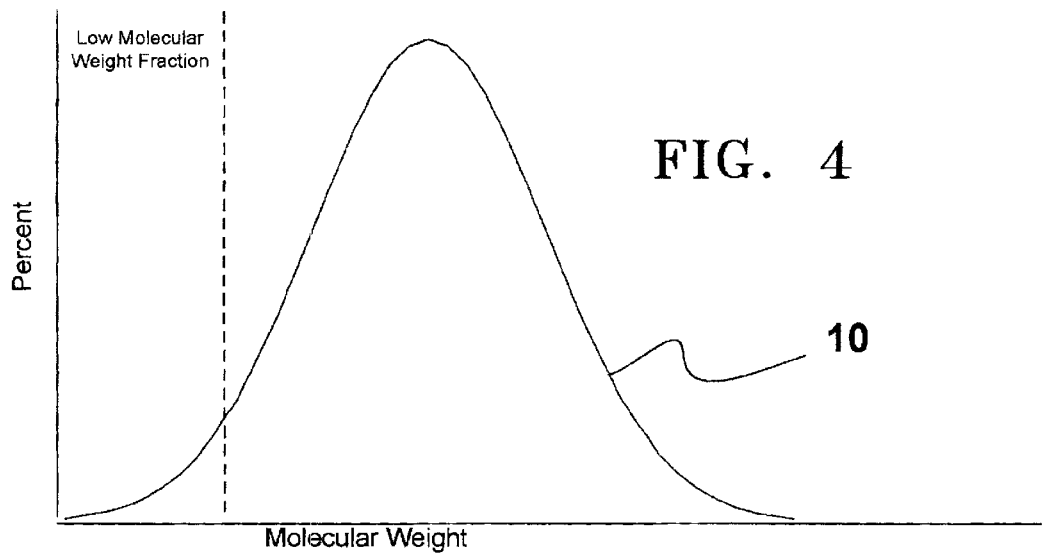
FIG. 4 shows the molecular weight distribution for a typical unimodal HDPE copolymer utilized for corrugated HDPE pipe having low ESCR
Figure 5:
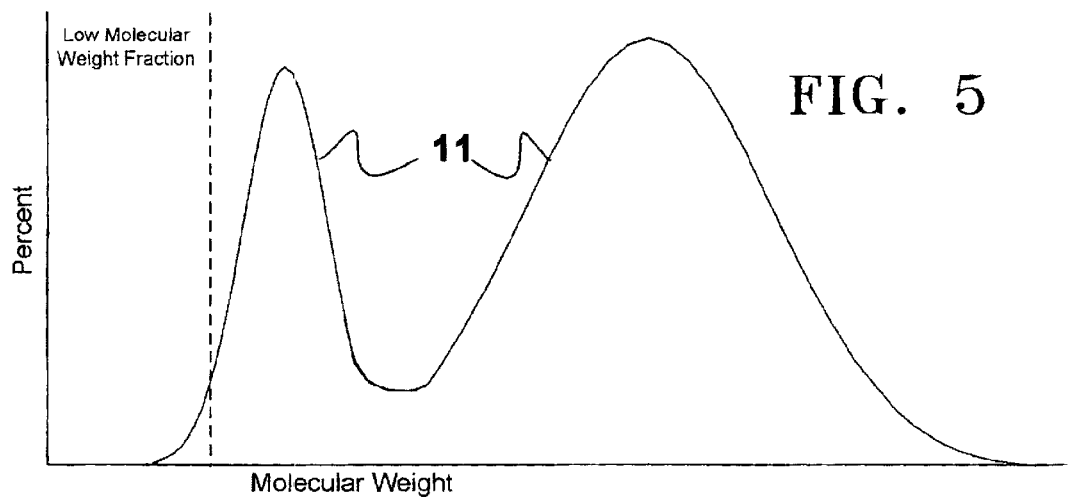
FIG. 5 shows a molecular weight distribution for a typical commercially available as polymerized bimodal HDPE copolymer.
Figure 6:
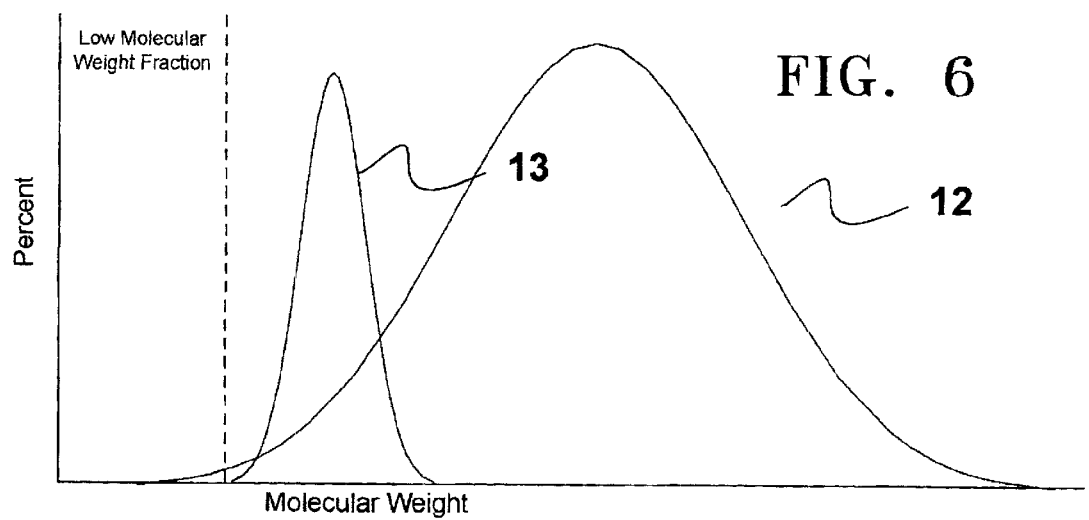
FIG. 6 shows the molecular weight distribution for a unimodal HMW HDPE and low molecular weight narrow molecular distribution HDPE.
Figure 7:
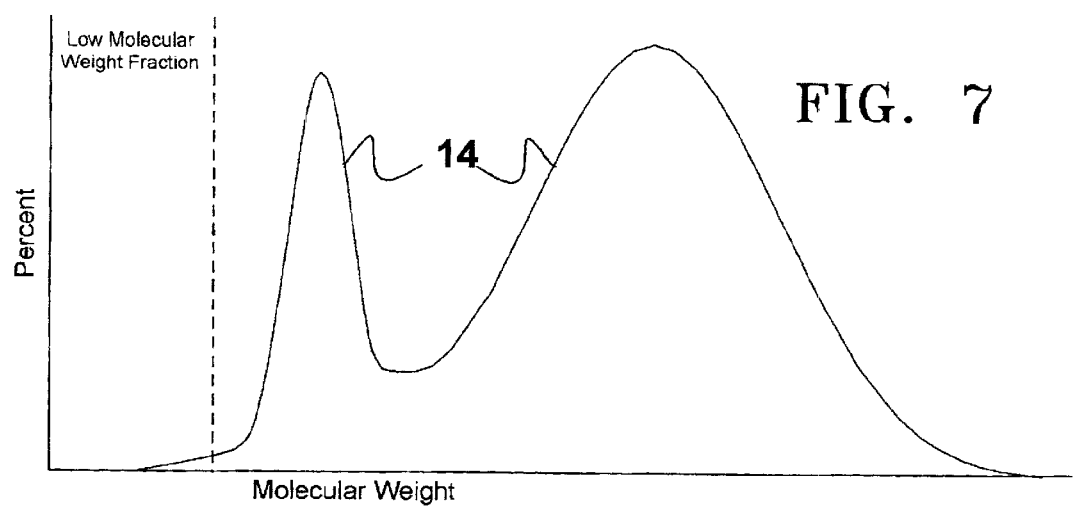
FIG. 7 shows the bimodal molecular weight distribution for a melt blend of the invention of a unimodal HMW HDPE and low molecular weight narrow molecular distribution HDPE.

An embodiment of the invention provides for the major component of the blend to be a HMW HDPE 12 shown in FIG. 6 such as a blow molding resin used for drums or gas tanks having a broad unimodal molecular weight distribution, e.g., Chevron Phillips Marlex® HXM 50100-02. An alternate source may be recycled or regrind 50 gallon drums or gas tanks. The major component of HMW HDPE 12 in FIG. 6 has a molecular weight sufficiently high to reduce the low molecular weight fraction as compared to a typical blow molding resin 10 (FIG. 4). To adjust processability and performance, a mixture 13 (FIG. 6) of low molecular weight HPDE homopolymers and copolymers having a narrow molecular weight is blended with the HMW HDPE copolymer 12 in FIG. 6 to obtain the desired the MI and density of the blend 14 shown in FIG. 7. The molecular distribution of the resulting polyethylene composition is bimodal or multimodal, having a much reduced low molecular weight fraction as compared to a typical blow molding grade unimodal copolymer 10 and the as polymerized specialty multi-modal copolymer 11 shown in FIGS. 4 and 5 respectively.

Figure 8:
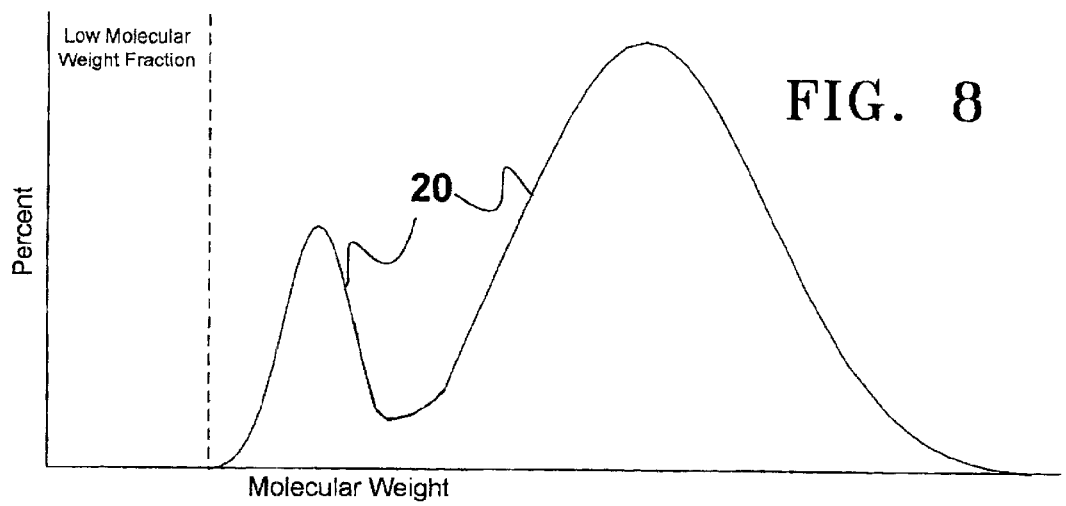
FIG. 8 shows the bimodal molecular weight distribution of a typical film grade HMW HDPE.
Figure 9:
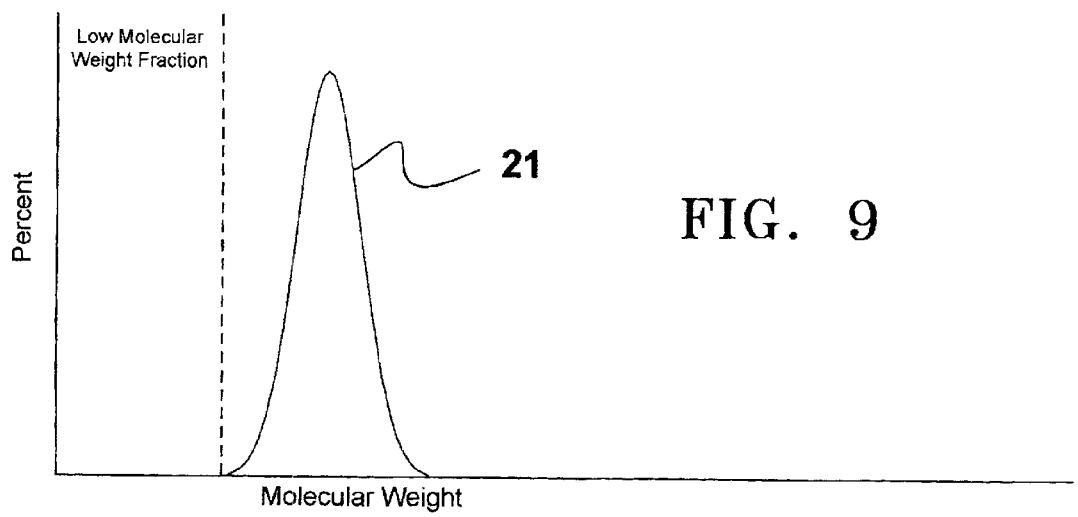
FIG. 9 shows the molecular weight distribution of a low molecular weight HDPE homo-polymer and copolymer.
Figure 10:
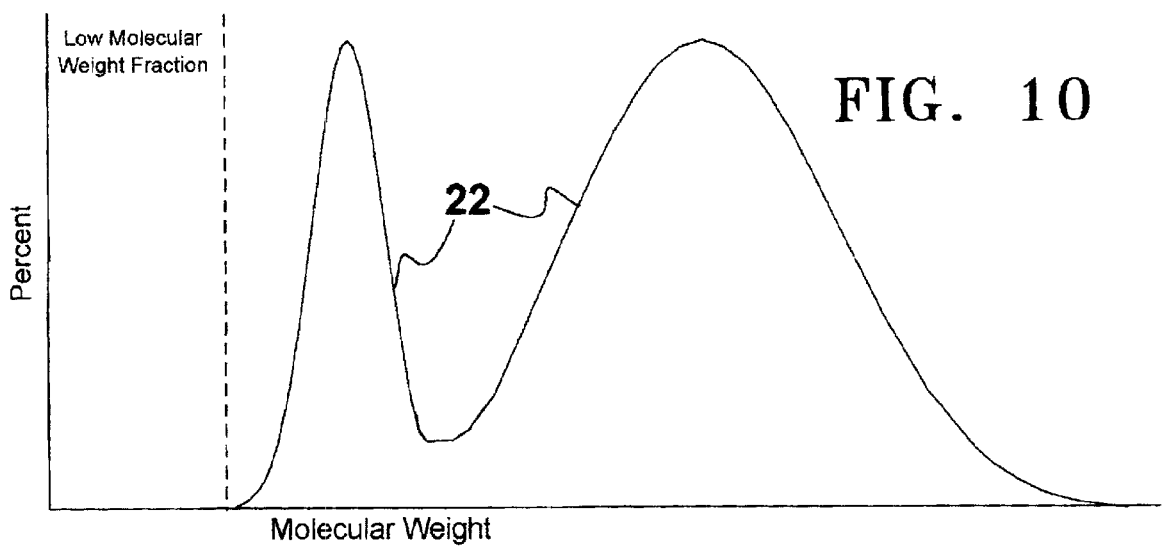
FIG. 10 shows the multi-modal molecular weight distribution of a melt blend of the invention of a film grade typical film grade HMW HDPE and low molecular weight HDPE copolymer and homo-polymer.

A further embodiment utilizes HMW HDPE major component 20 (FIG. 8) having a bimodal molecular weight distribution (MWD). Such HDPE is available as a commodity in the form of industrial and merchandise bag film grade high-density polyethylene, e.g., Exxon Mobil 7760. The HMW HDPE major component wherein the MWD of each peak is narrow and the peaks are spaced sufficiently far apart provide an overall broad MWD. The HMW bimodal film grade high-density polyethylene, typically, has a density of 0.949 to 0.955 grams per cubic inch and MI values of 0.01 to 1.0 grams per 10 minutes. The narrow MWD peaks, spread far apart eliminate the very long and the very short molecular species associated with unimodal polyethylene having the same weight average molecular weight. Environmental stress crack resistance of the bimodal HMW HDPE component 14 (FIG. 7) is increased as compared to the unimodal HMW HDPE component 12 (FIG. 6) having similar MI.

A mixture of low molecular weight HDPE homopolymer and copolymer components is utilized to enhance the processability and the physical properties of the resulting polyethylene composition. A mixture of narrow MWD injection molding grades of HDPE homopolymer, e.g., Equistar M 6580 and HDPE copolymer, e.g., Equistar M 5370 provide the low molecular weight (LMW) HDPE. The mixture 13 of LMW HDPE homopolymer and copolymer is shown in FIG. 6. The bulk of commercially available injection molding grade copolymers have a density of about 0.950 to about 0.957 grams per cubic centimeter and injection grade homopolymers a density of about 0.958 to about 0.968 grams per cubic centimeter and both having MI from about 1 to about 100 grams per 10 minutes. Density and MI of the polyethylene composition can be varied independently by adjusting the ratio of the relative amounts of LMW HPPE homopolymer and copolymer and the ratio of the relative amount of the mixture of the LMW HDPE homopolymer and copolymer to amount of the HMW HDPE.

It is preferred that the LMW HDPE homopolymer and copolymer components have significantly higher MI as compared to the unimodal and/or bimodal HMW HDPE copolymer to easily mix with the high viscosity melt and lower MI of the major component. This higher melt index also minimizes the amount of the minor component required to adjust MI of the HMW major component. The ESCR is lower less by utilizing significantly less LMW HDPE having higher MI values of about 2 to 20 grams per 10 minutes. The consequence of the increase in the amount of LMW HDPE is large compared to an increase in MI. The use of nigher MI values is preferable to adding more LMW HDPE. This relationship is believed to be counter to known conventions in the art.

The invention discloses polyethylene composition and method for HDPE blends having a density in the range of 0.945 to 0.955 grams per cubic centimeter, values of MI according to ASTM D1238 less than 0.4, minimum flexural modulus of 110,000 pounds per square inch according to ASTM D790 and tensile strength of 3,000 pounds per square inch according to ASTM D638 and notched constant tensile load (NCTL) ASTM D5397 greater than 24 hours. This is accomplished by melt blending at least one HMW HDPE and one LMW HDPE homopolymer or copolymer specified below wherein the HMW HDPE is the major component about 55% to about 85% and preferably 65% to 80% of the polyethylene composition and that the components comply with the following criteria:

High molecular weight (HMW) HDPE copolymer having a density in the range of about 0.945 to about 0.955 preferably about 0.949 to about 0.953 grams per cubic centimeter and MI values of about 0.01 to about 0.1 more preferably about 0.02 to about 0.075 grams per 10 minutes and FRR of about 120 to about 280 preferably about 150 to about 200.

Low molecular weight (LMW) HDPE homopolymer having a narrow molecular weight distribution (MWD) demonstrated by FRR of about 20 to about 60 preferably about 20 to about 50, a density in the range of about 0.955 or about 0.968 preferably about 0.960 to about 0.968 grams per cubic centimeter and MI of about 2 to about 80 preferably about 3 to about 30 grams per 10 minutes.

Low molecular weight (LMW) HDPE copolymer having a narrow molecular weight distribution (MWD) demonstrated by a FRR of about 20 to about 60 preferably about 20 to about 50, a density in the range of about 0.947 to about 0.955 preferably about 0.949 to about 0.955 grams per cubic centimeters having MI of about 2.0 to about 80 preferably about 3 to about 30 grams per 10 minutes.

Utilizing these criteria and the method described below will provide polyethylene compositions having the ESCR values for NCTL test exceeding 70 hours and in many cases in excess of 200 hours.

The preferred method of determining the weight fractions of the HMW HDPE, LMW HDPE homopolymer and LMW copolymer is as follows:

Select the desired density and MI for the resulting polyethylene composition.

For example, the manufacturer may be able to purchase a low cost reprocessed HMW weight component having a MI of 0.949 grams per cubic centimeter and a MI of 0.05 grams per 10 minutes but should require the polyethylene composition to have a density of 0.952 grams per cubic centimeter and a melt index of 0.25 grams per 10 minutes for pipe performance and processability respectively.

Select source materials that meet the above criteria.

For the example, the melt blend of the following components:

HMW HDPE has a density of 0.949 grams per cubic centimeter and a MI of 0.05 grams per 10 minutes, LMW HDPE homopolymer has a density of 0.965 grams per cubic centimeter and a MI of 8.0 grams per 10 minutes.

LMW HDPE copolymer has a density of 0.953 grams per cubic centimeter and a MI of 6.6 grams per 10 minutes.

Determine the ratio of amount of LMW HDPE homopolymer component to HMW HDPE component so that the mixture meets the desired density.

For the example, 0.33 parts by weight of LMW HDPE homopolymer is required to be added for each part by weight of the HMW HDPE to provide a polyethylene composition having a density 0.953 grams per cubic centimeter.

Determine the weight fraction of the LMW HDPE copolymer required to meet the desired MI requirement and report the relative amounts of all components.

In this example, a polyethylene composition comprising by weight: 67.9% of the HMW HDPE (Formosa Plastics Corp America, Formalene E905); 22.6% of the LMW HDPE homopolymer (ExxonMobil HD 6908); and 9.4% of the LMW HDPE copolymer (Chevron Chemical Company HiD 9906) are melt blended. The resulting polyethylene composition has a density of 0.953 grams per cubic centimeter and a MI of 0.25 grams per 10 minutes.

In this example the ESCR exceeds 100 hours.

Corrugated polyethylene pipe is produced over a broad range of diameters from about 2 inches to about 72 inches. The melt strength of the extruded parison or tube of polymer melt required to form the outer shell of the pipe and the inner liner for dual wall pipe varies with pipe diameter. Melt strength is related to MI and FRR. Also the required physical properties of the single wall and dual wall pipe also vary with pipe diameter. Smaller corrugated single wall pipe (about 2 to 10 inch diameter) is typically produced with higher MI polyethylene compositions. The higher MI allows rapid forming and high line speeds. Intermediate dual wall corrugated HDPE pipe (about 12 to about 36 inch diameter) requires a lower MI for increased melt strength to support the larger diameter of the extruded parison or melt tube that is formed into the outer shell or corrugation. The rheological properties (viscosity, MI) ideal for the outer shell differs for the liner due to the need to thermoform the corrugation and thereby stretching the polymer melt.

For the larger diameter corrugated HDPE pipe (about 42 to about 72 inch diameter) the need for lower MI is increased to prevent parison sag. The physical properties of the polyethylene composition, required for the finished corrugated HDPE pipe to pass the low temperature drop weight impact, yield and PII tests specified by AASHTO, are different depending on the pipe diameter, liner or shell, profile of the corrugation and more. Since the flexural modulus and tensile strength vary directly with the density of the HDPE utilized, varying the density of the polyethylene composition provides the supplier a margin of safety that is often required to compensate to size shape and process variations. The current AASHTO standards require 0.945 to 0.955 grams per cubic centimeter and MI less than 0.4 grams per 10 minutes.

Since the corrugated HDPE pipe manufacturer produce many different varieties of corrugated pipe, fabricated and molded fittings, there is a variety of MI and density values required. Typical polyethylene compositions utilized have values of density from about 0.952 to 0.955 grams per cubic centimeter and values of MI from 0.2 to 0.32 grams per 10 minutes.

The following examples were chosen to demonstrate that the method of selecting and blending the HMW HDPE copolymer, LMW HDPE homopolymer and LMW HDPE copolymer provides the corrugated HDPE pipe manufacturer with polyethylene compositions and the means to independently select physical properties and enhance processability and exceed AASHTO's standard for ESCR.

Example 1 requires the polyethylene composition to have a density of 0.952 grams per cubic centimeter and MI of 0.2 grams per 10 minutes.

Example 2 requires the polyethylene composition to have a density of 0.952 grams per cubic centimeter and MI of 0.32 grams per 10 minutes.

Example 3 requires the polyethylene composition to have a density of 0.953 grams per cubic centimeter and MI of 0.2 grams per 10 minutes.

Example 4 requires the polyethylene composition to have a density of 0.953 grams per cubic centimeter and MI of 0.32 grams per 10 minutes.

The four examples were chosen by selecting the four combinations of the limits of density and MI typically utilized by the corrugated HDPE manufacturer. For examples both a unimodal and bimodal HMW HDPE copolymer were chosen. The unimodal HMW HDPE utilized is Chevron Phillips Chemical Company HXM 50100-02 having a density of 0.950 grams per cubic centimeter and MI of 0.05 grams per 10 minutes. The bimodal utilized for the examples is Equistar L5005 having a density of 0.949 grams per cubic centimeter and MI of 0.06 grams per 10 minutes. However many HWM HDPE copolymers are suitable, a partial list includes: Formosa Plastics Corp. Formalene F904 and F905; Exxon Mobil Chemical Company HD-7760, HD-7745, HD-77-700F and HD 7755; Equistar L4907 AND L 4903.

The LMW HDPE homopolymer utilized in the examples is Exxon Mobil Chemical Company HD-6908 having a density of 0.962 grams per cubic centimeter and MI of 8 grams per 10 minutes. Other suitable LMW HDPE homopolymers include: Formosa Plastics Corp. LH6008; Chevron Phillips Chemical Company HiD 9708, HiD 9707D, HiD-9706, HiD 9659 and HiD 9662; Equistar M6580, M6060 and M6030; Dow Chemical Co. Dowlex IP 10262 and Dowlex IP 10; Huntsman Corporation H2105.

The LMW HDPE copolymer utilized in the examples is Formosa Plastics Corp. Formalene LH5212 having a density of 0.952 grams per cubic centimeter and MI of 12 grams per 10 minutes. However the following LMW HDPE copolymers only a partial list of alternative LMW HDPE copolymers: Exxon Mobil Chemical Company HD 6706 and HD 6704; Chevron Phillips Chemical Company HiD 9012, HiD 9004 and HiD 9006; Formosa Plastics Corp. Formalene LH5204 and LH5206; Equistar M5370 and M5350; and Dow Chemical Company Polyethylene 04452N.

In each example, the desired density was utilized to determine the ratio of the LMW HPDE homopolymer to the HMW HDPE copolymer. This is accomplished with the linear density relationship described above wherein the density of a mixture equals the sum of the product of the weight fraction and the density of each component. Also the MI of such a mixture of the LMW HDPE homopolymer and HWM copolymer is determined by the logarithmic algorithm in which the logarithm of the mixture is equal to the sum of the product of the weight fraction and the logarithm of the MI of each component. Finally, the ratio of the amount of LWM HDPE copolymer to the combined amount of the LMW HDPE homopolymer and HMW copolymer is determined by using the logarithmic algorithm a second time to determine the weight fraction of the LMW HDPE copolymer required for the polyethylene composition to have the desired MI.

The results are shown in the table below:

| Unimodal HMW copolymer blended with LMW homopolymer and copolymer | | | | | |
|---|---|---|---|---|---|
| Density (grams per cubic centimeter) | MI (grams per 10 minutes) | Weight percent HMW Copolymer | Weight percent LMW HDPE Copolymer | Weight percent LMW HDPE Homopolymer | ESCR (hours) |
| 0.952 | 0.2 | 73.9 | 14.8 | 11.4 | >100 |
| 0.952 | 0.32 | 65.4 | 24.6 | 10.1 | >70 |
| 0.953 | 0.2 | 73.3 | 8.3 | 18.3 | >100 |
| 0.953 | 0.32 | 64.9 | 18.8 | 16.2 | >70 |

| Bimodal HMW copolymer blended with LMW homopolymer and copolymer | | | | | |
|---|---|---|---|---|---|
| Density (grams per cubic centimeter) | MI (grams per 10 minutes) | Weight Fraction of HMW Copolymer | Weight fraction of LMW HDPE Copolymer | Weight Fraction of LMW HDPE Homopolymer | ESCR (hours) |
| 0.952 | 0.2 | 75.2 | 7.4 | 17.4 | >200 |
| 0.952 | 0.32 | 66.6 | 18.0 | 15.4 | >100 |
| 0.953 | 0.2 | 74.6 | 0.5 | 24.9 | >200 |
| 0.953 | 0.32 | 66.1 | 11.9 | 22.0 | >100 |

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrations as described. Rather, it is intended that the scope of the invention be determined by the appended claims.

What is claimed is:

1. A melt blend of HMW HDPE having a density in the range of about 0.945 to about 0.955 grams per cubic centimeter and MI values of about 0.01 to about 0.1 grams per 10 minutes and FRR of about 120 to about 280 selected from me group of virgin pellets, recycled, reprocessed, off specification, and wide specification grades of HDPE, and one or more than one of 1) a low molecular weight (LMW) HDPE homopolymer and 2) a LMW HDPE copolymer selected from the group of virgin pellets, recycled, reprocessed, off specification, and wide specification grades of HDPE, in a ratio in which the logarithm of the melt index (MI) of the blend equals the sum of 1) the products of each weight fraction of the HMW HDPE, the LMW HOPE homopolymer arid the LMW HDPE copolymer in the blend and 2) the logarithm of the MI of the respective HMW HDPE, LMW HDPE homopolymer and the LMW HDPE copolymer in the blend.

2. The blend of claim 1 in which the LMW HDPE homopolymer has a FRR of about 20 to about 60, a density in the range of about 0.955 to about 0.968 grams per cubic centimeter, and a MI of about 2 to about 80 grams per 10 minutes.

3. The blend of claim 1 in which the LMW HDPE copolymer has a FRR of about 20 to about 60, a density in the range of about 0.947 to about 0.955 grams per cubic centimeters, and a MI of about 2.0 to about 80 grams per 10 minutes.

4. A melt blend of claim 1 having an ESCR equal to or exceeding about 24 hours.

5. The melt blend of claim 1 in which the HMW HDPE component is about 50% to about 95% by weight fraction.

6. The melt blend of claim 1 in which the HMW HDPE component has a density in the range of about 0.945 to about 0.955 grams per cubic centimeter.

7. The melt blend of claim 1 in which the HMW HDPE component has MI values in the range of about 0.01 to about 0.1 per 10 minutes.

8. The melt blend of claim 1 in which the HMW HDPE component has a FRR in the range of about 120 to about 280.

9. A method for manufacturing a corrugated polyethylene pipe in accordance with claim 1 in which, after the step of melt blending the HMW HDPE and the LMW HDPE copolymer, and, if the selected density for the blended composition is greater than the density of the HMW HDPE, the LMW HDPE homopolymer, in the amounts determined, the materials blended are formed into a corrugated polyethylene pipe.

* * * * *